United States Patent
Taki et al.

[11] Patent Number: 5,309,259
[45] Date of Patent: May 3, 1994

[54] COLOR OUTPUTTING METHOD AND APPARATUS FOR CORRECTING COLOR RATIOS OF SMALL-SIZED CHARACTERS

[75] Inventors: Hironobu Taki, Kawasaki; Shuichi Kumada, Yokohama, both of Japan

[73] Assignee: Canon Kabushiki Kaisha, Tokyo, Japan

[21] Appl. No.: 772,961

[22] Filed: Oct. 8, 1991

[30] Foreign Application Priority Data

Oct. 9, 1990 [JP] Japan .................... 2-269622

[51] Int. Cl.⁵ ............................ H04N 1/393
[52] U.S. Cl. ...................... 358/528; 358/451
[58] Field of Search .................. 358/75-80, 358/451, 457, 528

[56] References Cited

U.S. PATENT DOCUMENTS

| | | | |
|---|---|---|---|
| 4,743,963 | 5/1988 | Abuyama | 358/528 |
| 4,872,064 | 10/1989 | Tutt et al. | 358/528 |
| 4,937,678 | 6/1990 | Murai et al. | 358/528 |
| 4,958,237 | 9/1990 | Kubota | 358/528 |

FOREIGN PATENT DOCUMENTS

| | | |
|---|---|---|
| 0473389 | 3/1992 | European Pat. Off. |
| 62-286380 | 12/1987 | Japan |
| 2-063864 | 3/1990 | Japan |

*Primary Examiner*—Stephen Brinich
*Attorney, Agent, or Firm*—Fitzpatrick, Cella, Harper & Scinto

[57] ABSTRACT

Color outputting method and apparatus are disclosed. A size of character to be generated is discriminated. Ratios of coloring materials constructing the color to be generated are corrected when the size of character is smaller than a predetermined value. When the coloring materials are corrected, the ratio of the coloring material of the highest ratio is set into 100% and the ratios of the other coloring materials are increased by only the same value as the highest ratio. Thus, a permanent visible color image can be formed at any size and in any color.

10 Claims, 10 Drawing Sheets

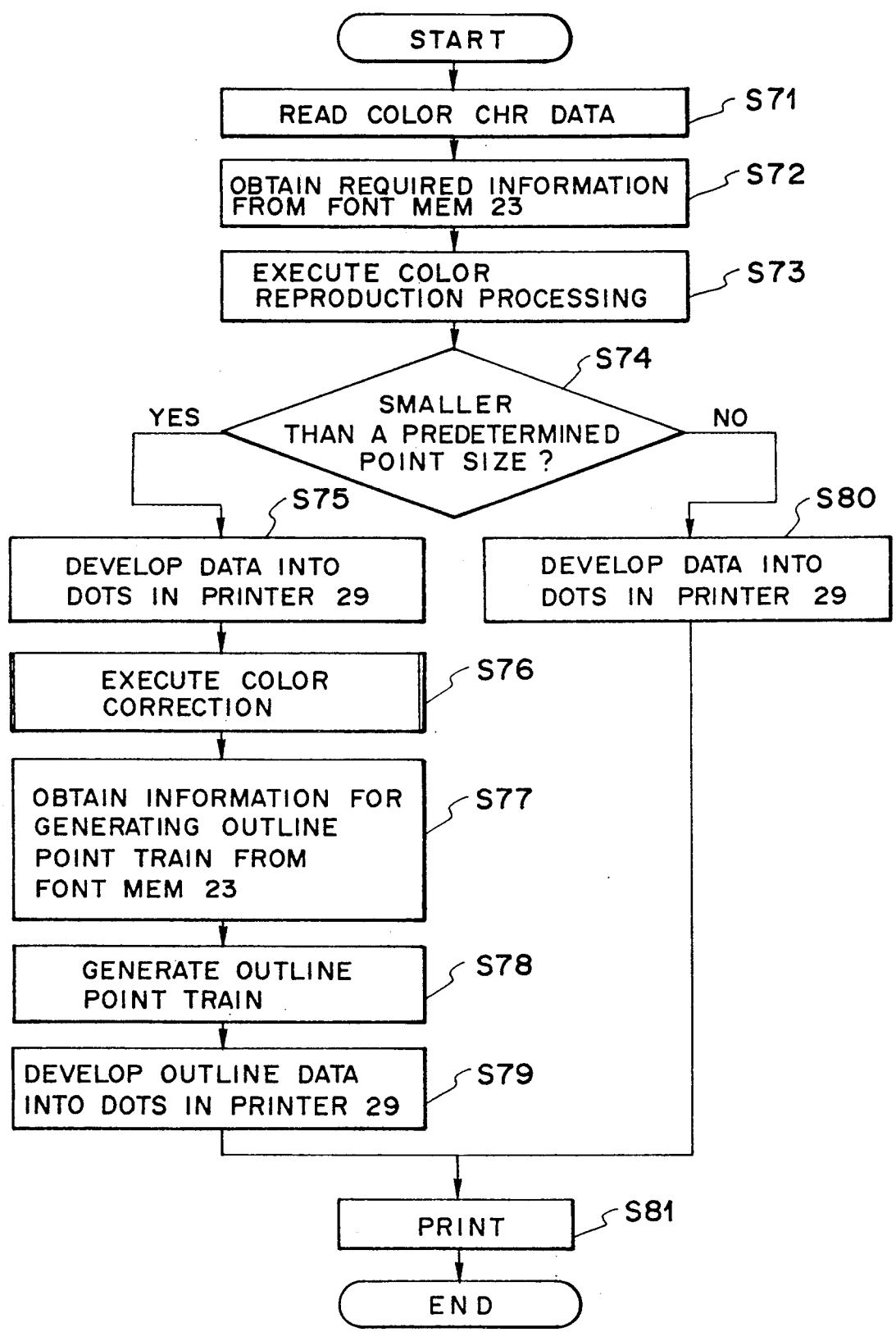

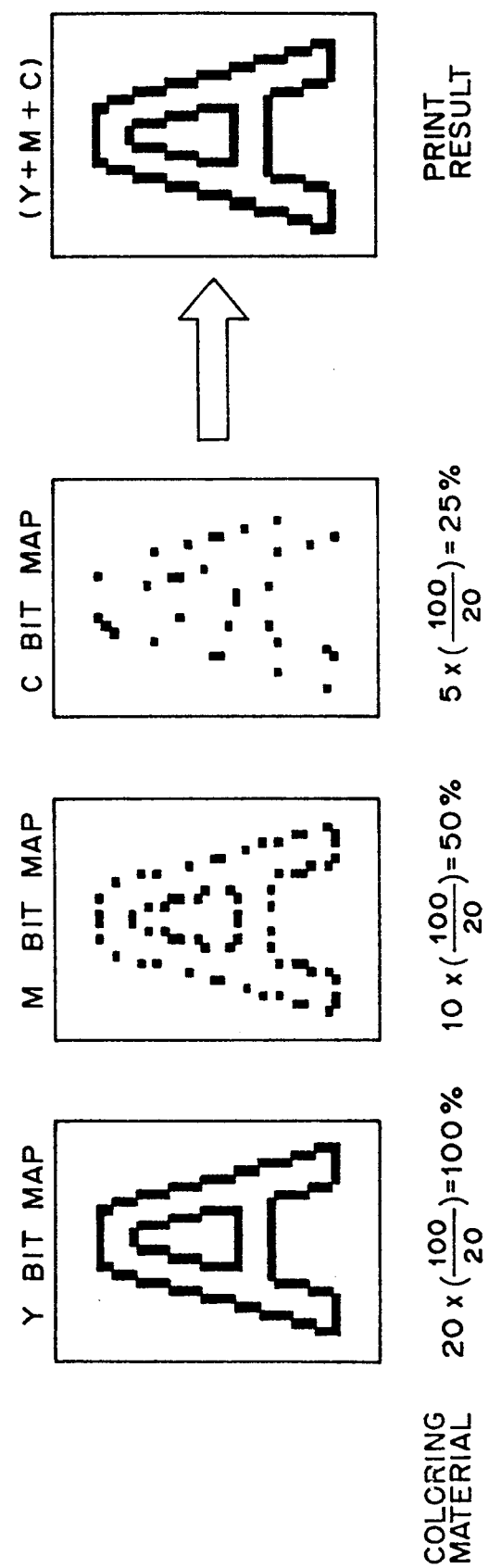

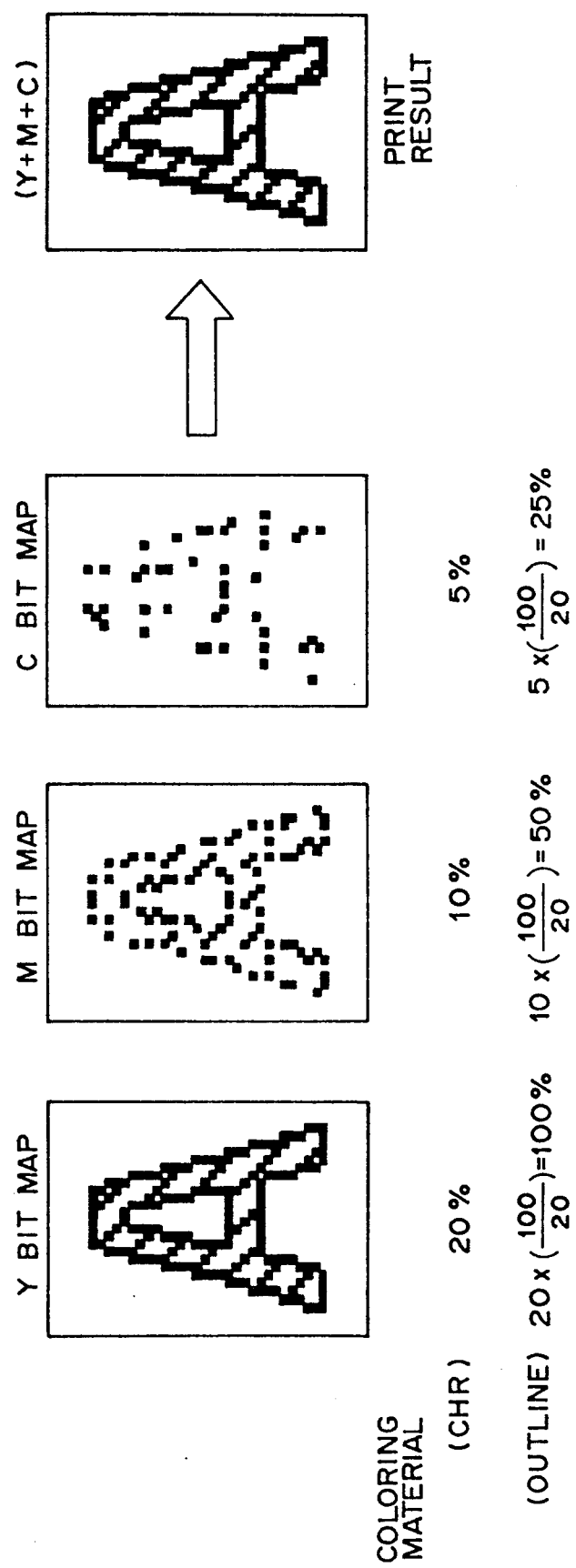

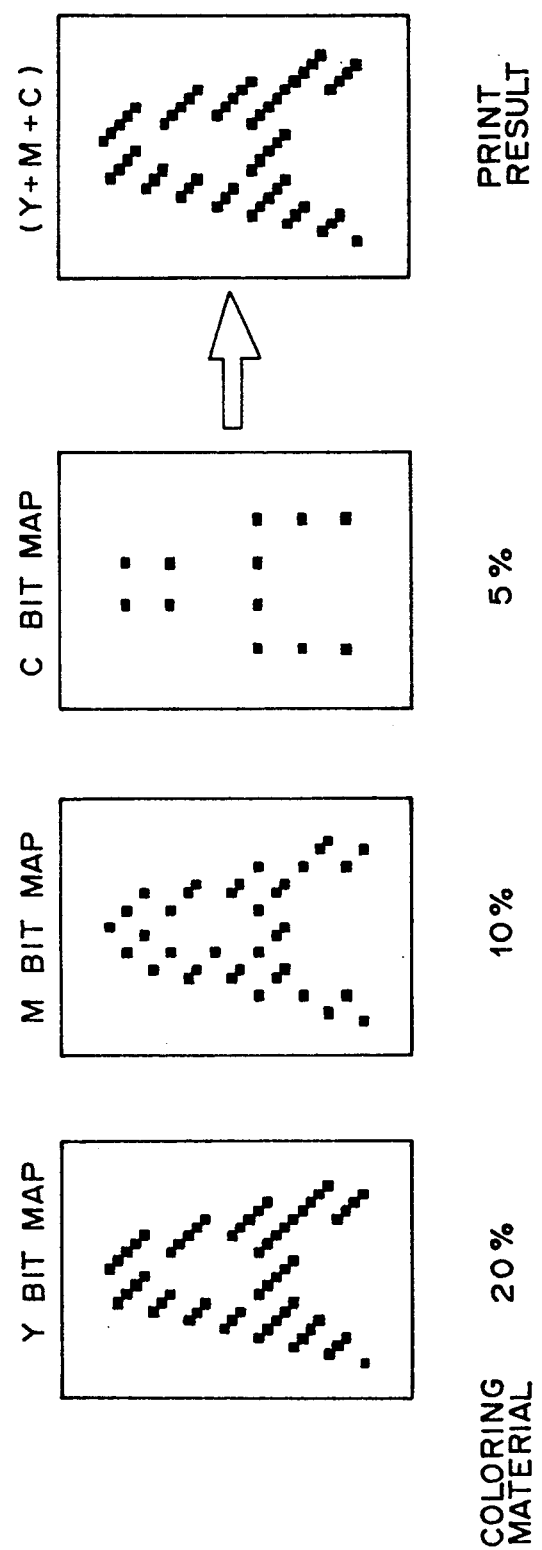

COLOR OUTPUTTING METHOD AND APPARATUS FOR CORRECTING COLOR RATIOS OF SMALL-SIZED CHARACTERS

BACKGROUND OF THE INVENTION

1. Field of the Invention

The invention relates to color outputting method and apparatus which can execute a clear color output even in any size and any color.

2. Description of the Related Background Art

Hitherto, in color outputting methods and apparatus, there are methods and apparatuses in which the color is corrected or an outline of information to be generated is emphasized in correspondence to changes in other situations. However, methods and apparatuses in which processings are changed in correspondence to a change in dark/light state of color or a change in size of character are not provided yet.

The conventional technique, therefore, has a drawback such that in the case where a character of a predetermined size or less is printed in a light color, namely, in a color in which ratios of coloring materials such as toners or inks are small, a part of the character is missed as shown in FIG. 10.

SUMMARY OF THE INVENTION

It is an object of the invention to eliminate the conventional drawback and to provide a color printer apparatus which can also print a character of a predetermined size or less without missing a part thereof.

Another object of the invention is to provide a color printer apparatus which can print not only a character which is not missed but also a clear character.

To solve the above drawback, according to color outputting method and apparatus for executing a color output in the invention, a size of character to be generated is discriminated and a ratio of the coloring material is corrected on the basis of the size decided.

Further, an outline of the character is emphasized on the basis of the corrected ratio of the coloring material.

In the above method and apparatus, a check is made to see if the size of a character to be generated is equal to or smaller than a predetermined point size or not, and in the case of generating a character of the predetermined point size or less, ratios of the coloring materials such as toners or inks are corrected, thereby controlling the generation of the character which is never missed. Further, by emphasizing the outline of the character, the generation of a clear character which is not missed is controlled.

BRIEF DESCRIPTION OF THE DRAWINGS

FIG. 7 is a flowchart for processing color character data sent from an external apparatus and for generating a color print according to the second embodiment;

FIG. 8 is a diagram showing an example in the case where ratios of toners or inks are corrected and the outline of a character is drawn according to the second embodiment;

FIG. 9 is a diagram showing an example in the case where the print result by the conventional printer apparatus and the outline of the character drawn by correcting the ratios of the toners or inks have been combined and printed according to the second embodiment; and FIG. 10 is a diagram showing an example of the print result by a conventional color printer apparatus.

DESCRIPTION OF THE PREFERRED EMBODIMENTS

Embodiments of the invention will be described hereinbelow with reference to the drawings.

Embodiment 1

Figure 1:
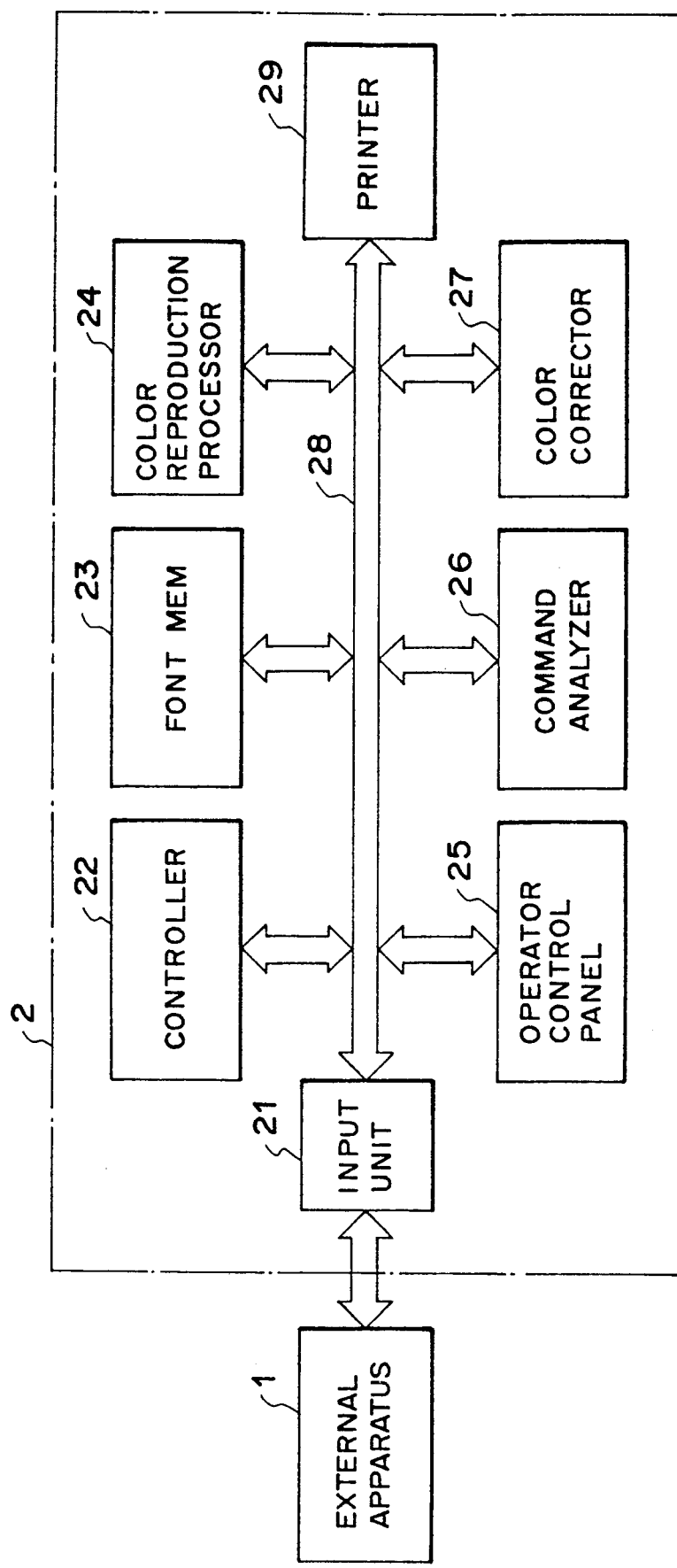
FIG. 1 is a block diagram showing a construction of a color printer apparatus of the first embodiment.

FIG. 1 is a block diagram showing a construction of a color printer apparatus according to the first embodiment. The apparatus comprises an external apparatus 1 such as a host computer or the like and a color printer apparatus main body 2. The external apparatus 1 such as a host computer or the like transmits print data, print command, and the like to the color printer apparatus main body 2, thereby allowing a print processing to be executed.

The main body 2 comprises: an input unit 21 which is constructed by a microprocessor including a ROM to store a processing program as shown in a flowchart, which will be explained hereinlater, and a RAM as an auxiliary memory and controls each of means, which will be explained hereinlater, and receives the print data, print command, and the like from the external apparatus 1; a controller 22 to control the whole color printer apparatus; a font memory 23 in which font information which is necessary for the print processing is stored; a color reproduction processor 24 to actually execute a color reproduction processing; an operator control panel 25 to enable parameters of print environment to be set and changed; a command analyze 26 to analyzer the print data, print command, and the like sent from the external apparatus 1; a color corrector 27 to correct ratios of the coloring materials such as toners or inks; a data bus 28 which is used to transmit and receive data and control signals to/from each section of the printer apparatus main body 2; and a printer 29 to form a permanent visual image onto a recording medium such as paper, sheet, or the like on the basis of the data which been formed and developed through the color reproduction processing.

Figure 2:
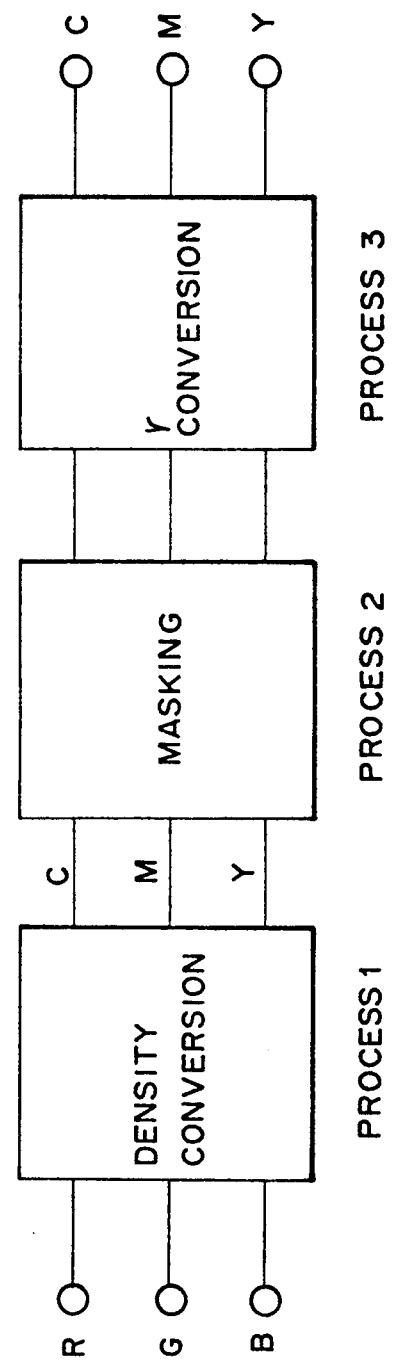
FIG. 2 is a diagram showing an example of color reproduction processings.

FIG. 2 is a diagram showing an example of processes for a color reproduction processing which are executed by the color reproduction processor 24. As an example of the color reproduction processing, processes for converting R (red), G (green), and B (blue) as three fundamental primary colors into C (cyan), M(magenta), and Y (yellow) as primary colors of the coloring materials such as toners or inks of the printer apparatus are shown.

In the process 1, there is executed a density conversion processing for executing a LOG (logarithm) conversion to the values of R, G, and B as luminance information and for converting into C, M, and Y as density information. In the process 2, there is executed a masking processing for correcting unnecessary absorbing characteristics of the toners or inks of C, M, and Y and for adjusting a proper color balance. In the process 3, there is executed a gamma conversion processing for adjusting a contrast and a brightness according to the image.

Figure 3:
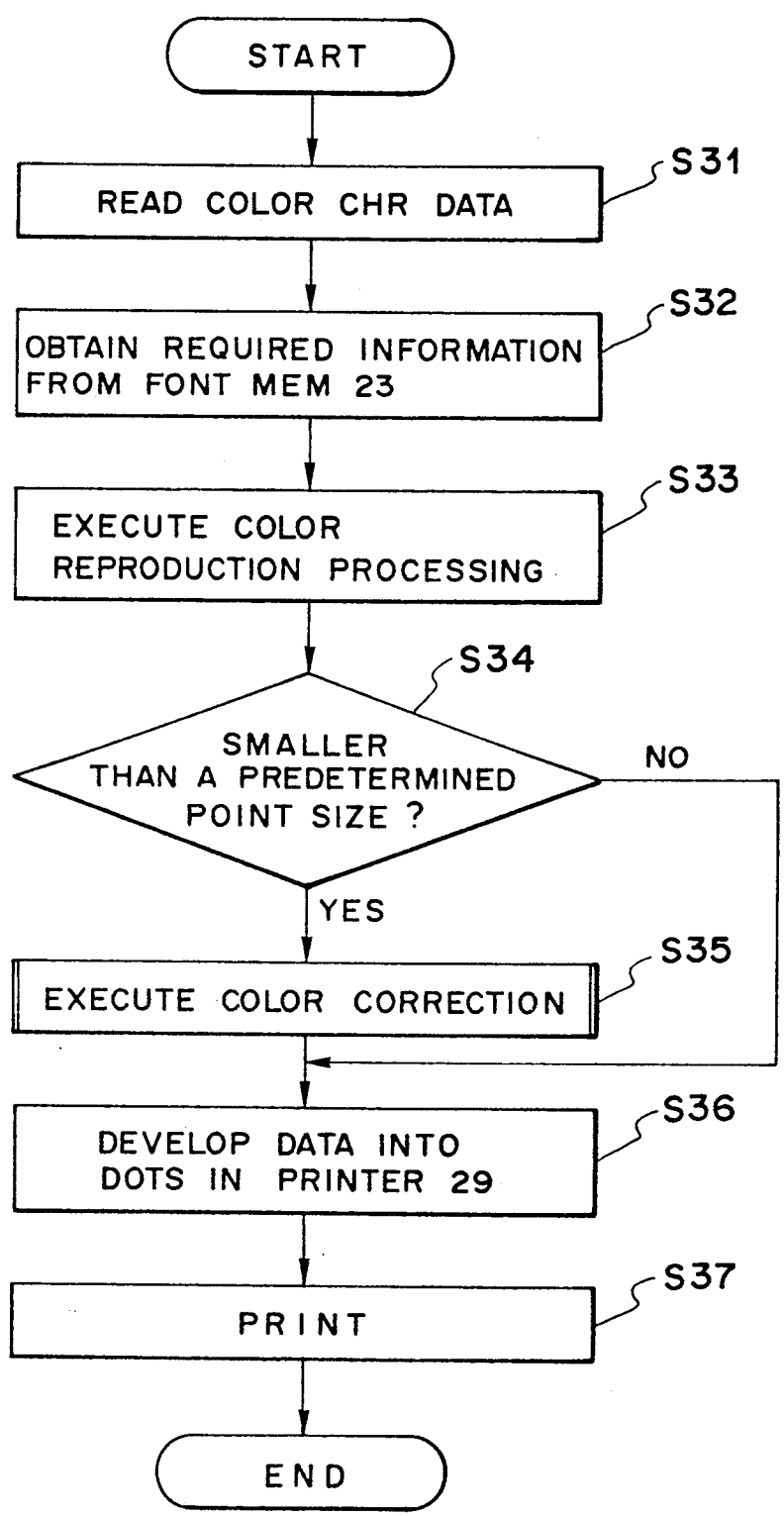
FIG. 3 is a flowchart for processing color character data sent from an external apparatus such as a host computer or the like and for generating a color print according to the first embodiment.

FIG. 3 is a flowchart showing a processing procedure of the color printer apparatus 2 in the first embodiment for processing the color character data transmitted from the external apparatus 1 and for generating a color print.

In step S31, the color character data sent from the external apparatus 1 is read from the input unit 21. The color character data denotes information of a character to be printed such as printing position, character size, and the like and information of the color of the character (a set of R, G, and B data are regarded as one item of data). In step S32, information such as a character pitch and the like which is necessary to print the character which has been read in step S31 is taken out of the font memory 23. In step S33, the color reproduction process of FIG. 2 is executed. The color information of the character is converted from the luminance information of R, G, and B into the density information of C, M, and Y.

In step S34, a check is made to see if a size of character to be printed is smaller than a predetermined point size or not. When the printing character is smaller than the predetermined point size, step S35 follows and a processing to correct the ratios of the coloring materials of the toners or inks is executed. In step S36, the printer 29 develops an image on the basis of the density information of C, M, and Y derived by the color reproduction process in step S33 and the color correction processing in step S35 and the character information necessary to print. In step S37, a permanent visible image of the character is formed onto a recording medium such as paper, sheet, or the like on the basis of the data developed in step S36. The recording medium after completion of the formation of the permanent visible image is discharged to the outside of the apparatus and the processing routine is finished.

Figure 4:
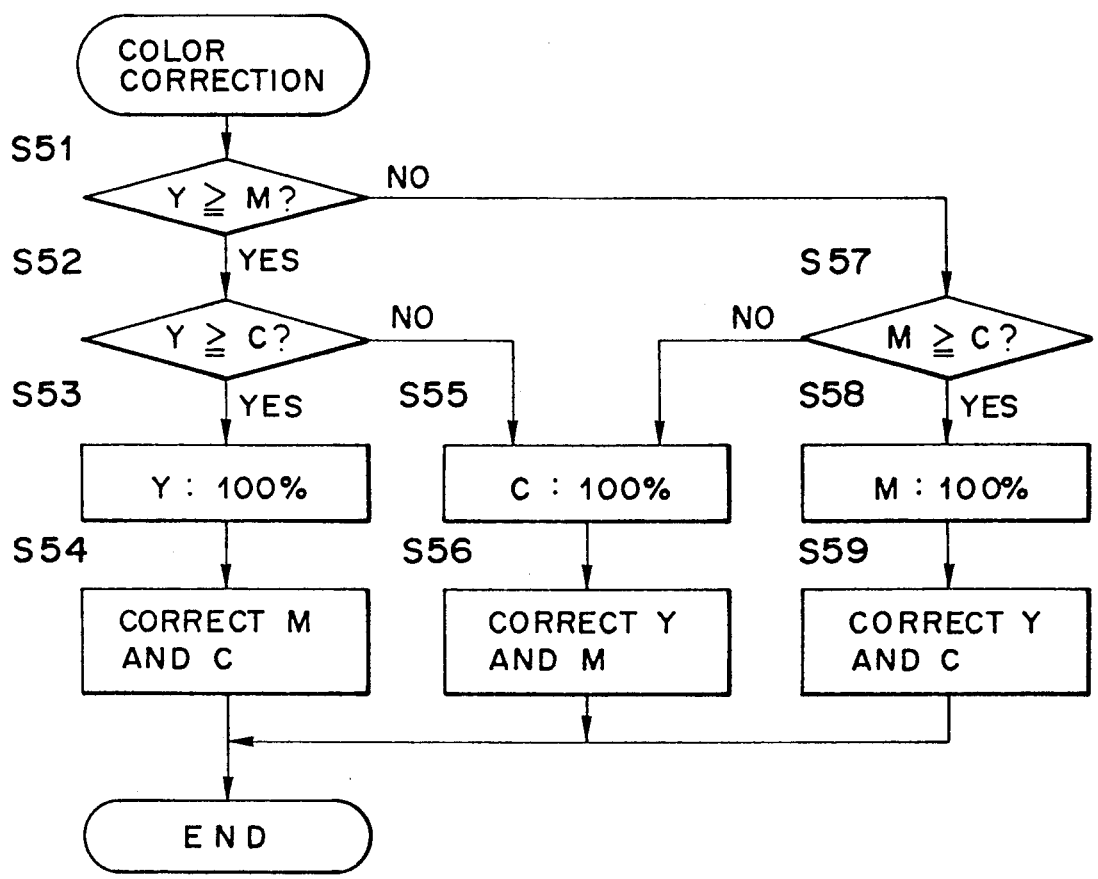
FIG. 4 is a flowchart showing an example of color correction processings.
Figure 5:
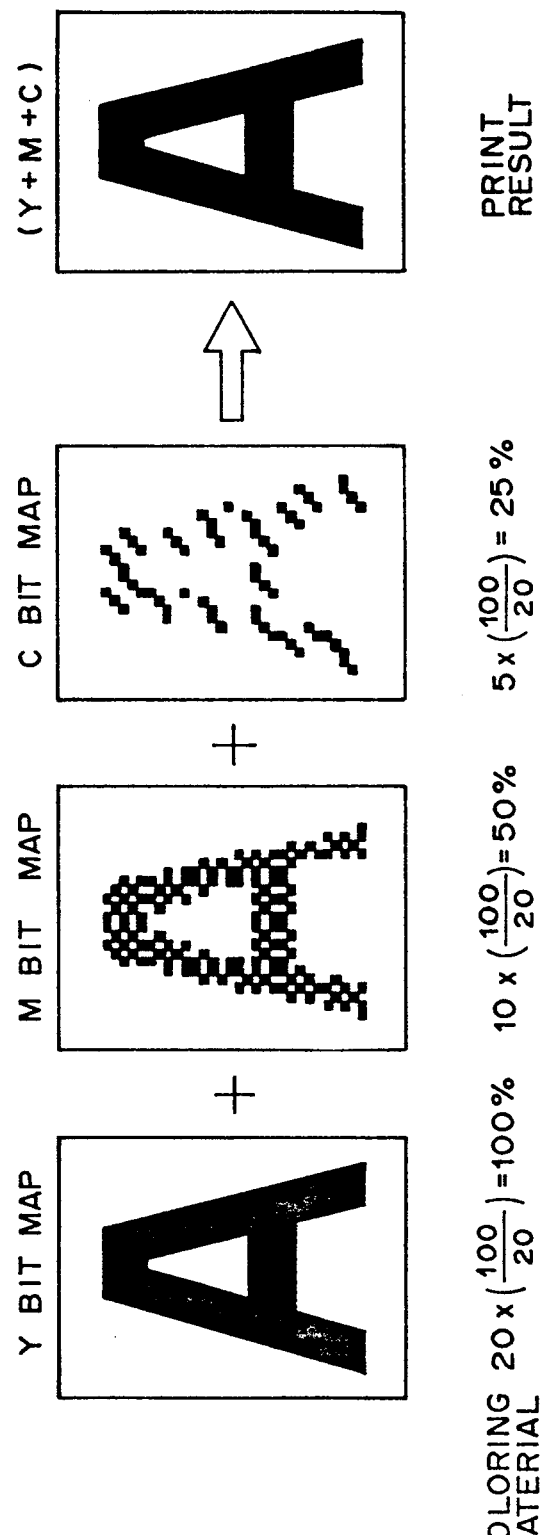
FIG. 5 is a diagram showing an example of the print result by the color printer apparatus of the first embodiment.

FIG. 4 is a flowchart showing an example of the processing which is executed in color correction processing step S35 in FIG. 3.

In step S51, the ratios of the coloring materials Y and M are compared. When the ratio of the coloring material Y is equal to or larger than the ratio of the coloring material M, step S52 follows. When the former is smaller than the latter, step S57 follows.

In step S52, the ratios of coloring materials Y and C are compared. When the ratio of the coloring material Y is larger than the ratio of the coloring material C, step S53 follows and the ratio of the coloring material Y is corrected to 100%. In step S54, the correction value used to set the ratio of the coloring material Y to 100% in step S53 is multiplied with the ratios of the coloring materials M and C, thereby correcting the ratios of the coloring materials M and C. The correction processings are finished. When the ratio of the coloring material Y is smaller in step S52, step S55 follows and the ratio of the coloring material C is corrected to 100%. In step S56, the correction value used to set the ratio of the coloring material C to 100% in step S55 is multiplied to the ratios of the coloring materials Y and M, thereby correcting the ratios of the coloring materials Y and M. The color correction processes are finished.

On the other hand, when the ratio of the coloring material Y is smaller than the ratio of the coloring material M in step S51, step S57 follows and the ratios of the coloring materials M and C are compared. When the ratio of the coloring material M is larger than the ratio of the coloring material C, step S58 follows and the ratio of the coloring material M is corrected to 100%. In step S59, the correction value used to set the ratio of the coloring material M to 100% in step S58 is multiplied to the ratios of the coloring materials Y and C, thereby correcting the ratios of the coloring materials Y and C. The color correction processings are finished. When the ratio of the coloring material M is smaller than the ratio of the coloring material C in step S57, steps S55 and S56 mentioned above are performed.

Figure 6:
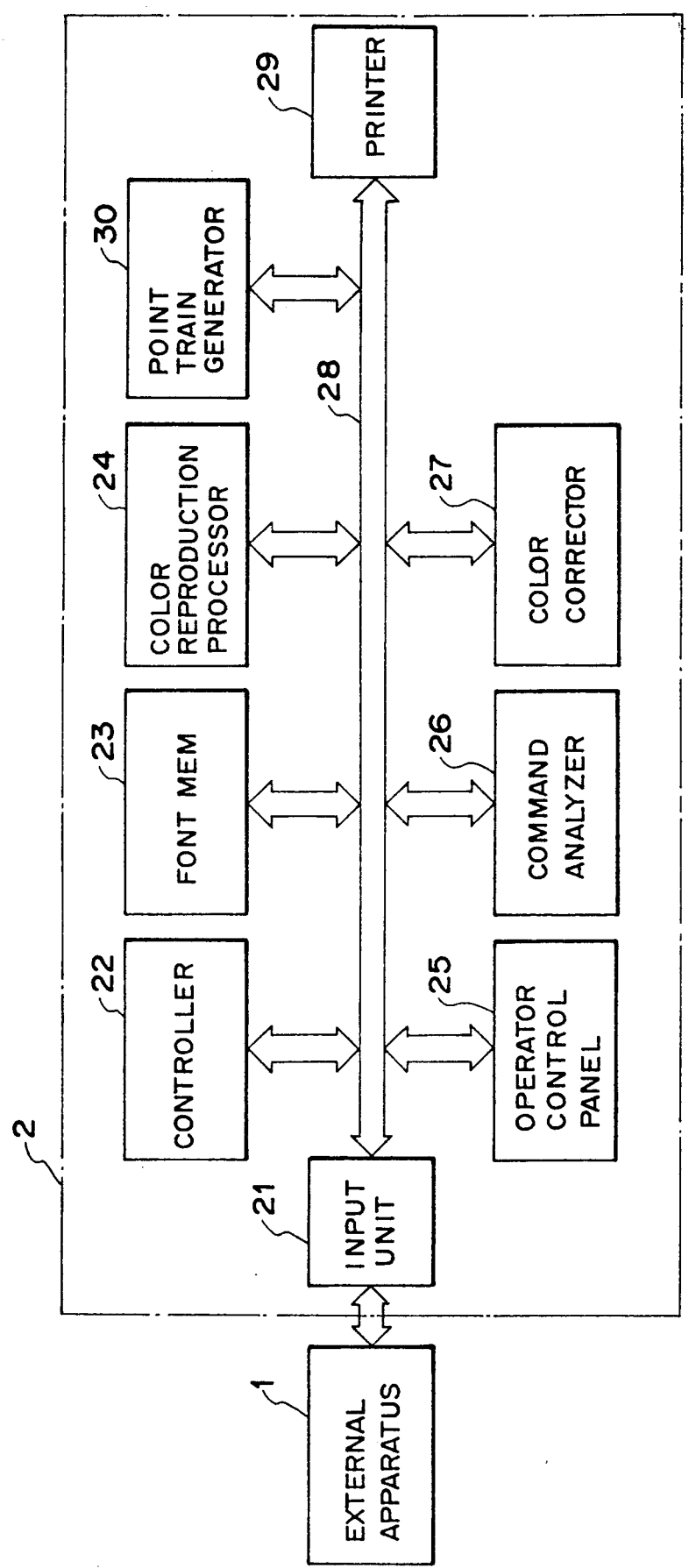
FIG. 6 is a block diagram showing a construction of a color printer apparatus of the second embodiment.

FIG. 6 shows an example in the case where the ratios of the coloring materials such as toners or inks have been corrected and a character has been printed in the case where a character of a predetermined point size or smaller is printed in a light color, that is, a color in which the coloring materials such as toners or inks are small under the same conditions as those in FIG. 10. The ratio of the coloring material Y whose density information is largest among the coloring materials Y, M, and C in FIG. 10 is corrected to 100%. The same correction value as that of the coloring material Y is also multiplied to the ratios of the other coloring materials M and C and the color correction processings are executed and the character is printed. Thus, a character which is not missed can be printed like a print result shown in FIG. 6.

As mentioned above according to the embodiment, in the case of printing a character of a predetermined point size or less in a light color, namely, a color in which the coloring materials of the toners or inks are small, the ratios of the coloring materials of the toners or inks are corrected and the character is printed, so that the character which is not missed can be printed. When comparing the color of the character before correction and the color after the correction, a saturation of the color after the correction slightly increases and the character can be printed in a color which is not so different from the color of the actual characteristic even when the correction was performed.

Embodiment 2

FIG. 6 is a block diagram showing a construction of a color printer apparatus according to the second embodiment. In the second embodiment, the same components as those shown in FIG. 1 are designated by the same reference numerals and they perform the same functions.

The components different from those in the first embodiment will now be described hereinbelow.

Reference numeral 30 denotes a point train generator of a character outline for generating outline points on the basis of the information necessary to generate point train of the character outline. The printer 29 forms a permanent visible image onto a recording medium such as a paper or the like on the basis of the data of the color of the character formed through the color reproduction processing and the color correction processing and the data developed by the information of the character and outline points which are necessary to print.

FIG. 7 is a flowchart showing a processing procedure of the color printer apparatus in the second embodiment for processing the color character data transmitted from the external apparatus 1 such as a host computer or the like and for generating a color print.

In step S71, the color character data sent from the external apparatus 1 is read from the input unit 21. In step S72, the information such as a character pitch and the like necessary to print the character which has been read in step S71 is taken out of the font memory 23. In step S73, the color reproduction processing in FIG. 2 is executed. The color information of the character is converted from the luminance information of R, G, and B into the density information of C, M, and Y.

In step S74, a check is made to see if a size of character to be printed is smaller than a predetermined point size or not. When the printing character is smaller than the predetermined point size, step S75 follows. If the printing character is equal to or larger than the predetermined point size, step S80 follows.

In step S75, the printer 29 develops the image on the basis of the density information of C, M, and Y of the coloring materials obtained by the color reproduction processing in step S73 and the character information necessary to print. In step S76, a process to correct the ratios of the coloring materials such as toners or inks is executed. In step S77, the information necessary to generate the point train of the character outline is taken out of the font memory 23. In step S78, the character outline point train generator 30 generates the outline points on the basis of the information necessary to generate the character outline point train derived in step S77. In step S79, the printer 29 develops the image on the basis of the density information of C, M, and Y of the coloring materials obtained by the color reproduction processing in step S73 and the color correction processing in step S76 and the character information necessary to print. The processing routine advances to step S81.

In step S80, the printer 29 develops the image on the basis of the density information of C, M, and Y of the coloring materials derived by the color reproduction processings in step S73 and the character information necessary to print and the processing routine advances to step S81. In step S81, a permanent visible image of the character is formed onto a recording medium such as a paper or the like on the basis of the data developed in steps S75 and S79 or S80. The recording medium after the image was formed is discharged to the outside of the apparatus and the processing routine is finished.

The processing which is executed in the color correction processing step S76 in FIG. 7 is the same as the processing in FIG. 4 mentioned above.

FIG. 9 shows an example in the case where a character obtained by printing a character of a predetermined point size or less in a light color, namely, a color in which the coloring materials of the toners or inks are small under the same conditions as those in FIG. 10 and the outline of the character drawn by correcting the ratios of the coloring materials of the toners or inks are combined and printed. Even when a character is printed in a color in which the ratios of the coloring materials of Y, M, and C are small, the character can be also printed without being missed like a print result as shown in the diagram.

According to the embodiment as mentioned above, in the case where a character of a predetermined point size or less is printed in a light color, that is, a color in which the coloring materials of the toners or inks are small, the character is printed in combination of the outline of the character drawn by correcting the ratios of the coloring materials of the toners or inks, so that the character can be printed without being missed.

FIG. 8 shows the result in the case where the processing routine is executed by omitting the processing step S75 in FIG. 7 in the second embodiment and the character is printed.

FIG. 8 shows an example in the case where the ratios of the coloring materials such as toners or inks are corrected and the outline of a character is drawn in the case where a character of a predetermined point size or less is printed in a light color, namely, a color in which the coloring materials of the toners or inks are small under the same conditions as those in FIG. 10. The ratio of the coloring material having the largest density information among the coloring materials of Y, M, and C in FIG. 10 is corrected to 100%. The same correction value as the above correction value is also multiplied to the other coloring materials M and C and the ratios thereof are corrected and the outline of the character is drawn. Thus, the character can be printed without being missed like the print result shown in FIG. 8.

The first and second embodiments have been described with respect to the case where the coloring materials C, M, and Y of the printer apparatus are used in the color reproduction processing. However, even in the case where C, M, Y, and K (black) are used as the coloring materials of the printer apparatus, the method of the embodiment can be applied by ignoring the value of K.

Although the first and second embodiments have been described with respect to only the drawing of the outline of a vector font, the invention can be also applied to the dot font by using a well-known outline drawing method.

Although the first and second embodiments have been described with respect to the case of developing the data into a binary bit map on the basis of the values of C, M, and Y, the invention can be also applied to a printer of multivalues.

The invention can be applied to a system comprising a plurality of apparatuses or a system comprising one apparatus. The invention can be also applied to the case where it is accomplished by supplying a program to a system or an apparatus.

What is claimed is:

1. A color outputting method comprising the steps of:
   discriminating the size of a character to be generated; and
   correcting ratios of coloring materials in accordance with the size discriminated.

2. A method according to claim 1, wherein the character size is discriminated by comparing with an arbitrary value.

3. A method according to claim 1, wherein the character size is discriminated by comparing with an arbitrary value, and when the character size is smaller than the arbitrary value, the correction of the coloring materials is executed.

4. A method according to claim 1, wherein the correction of the coloring materials is executed by using the coloring material having the highest percentage among the coloring materials constructing the color to be generated as a reference.

5. A method according to claim 1, wherein the correction of the coloring materials is executed by setting the ratio of the coloring material having the highest percentage among the coloring materials constructing the color to be generated into 100% by multiplying the ratio by a correcting value and by increasing the ratios of the other coloring materials using the same correcting value.

6. A color outputting apparatus comprising:
   discriminating means for discriminating the size of a character to be generated; and
   coloring material correcting means for correcting ratios of coloring materials in accordance with the size discriminated.

7. An apparatus according to claim 6, wherein the discrimination of the character size by said discriminating means is executed by comparing with an arbitrary value.

8. An apparatus according to claim 6, wherein the discrimination of the character size by said discriminating means is executed by comparing with an arbitrary value, and when the character size is smaller than the arbitrary value, the correction of the coloring materials is executed by said coloring material correcting means.

9. An apparatus according to claim 6, wherein said coloring material correcting means corrects the coloring materials by using the coloring material having the highest percentage among the coloring materials constructing the color to be generated as a reference.

10. An apparatus according to claim 6, wherein aid coloring material correcting means sets the ratio of the coloring material having the highest percentage among the coloring materials constructing the color to be generated into 100% by multiplying the ratio by a correcting value and increases the ratios of the other coloring materials using the same correcting value.

* * * * *

UNITED STATES PATENT AND TRADEMARK OFFICE
CERTIFICATE OF CORRECTION

PATENT NO. : 5,309,259
DATED : May 3, 1994
INVENTOR(S) : Hironobu Taki, et al.

It is certified that error appears in the above-indentified patent and that said Letters Patent is hereby corrected as shown below:

COLUMN 1:

Line 12, "apparatus," should read --apparatuses,--.

COLUMN 8:

Line 9, "aid" should read --said--.

Signed and Sealed this

Thirteenth Day of December, 1994

Attest:

BRUCE LEHMAN

Attesting Officer    Commissioner of Patents and Trademarks